United States Patent
Jang et al.

(10) Patent No.: US 12,531,292 B2
(45) Date of Patent: Jan. 20, 2026

(54) BATTERY PACK

(71) Applicant: Samsung SDI Co., Ltd., Yongin-si (KR)

(72) Inventors: Jinsung Jang, Yongin-si (KR); Hanho Kim, Yongin-si (KR); Heonhee Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 470 days.

(21) Appl. No.: 18/155,574

(22) Filed: Jan. 17, 2023

(65) Prior Publication Data

US 2023/0163380 A1 May 25, 2023

Related U.S. Application Data

(63) Continuation-in-part of application No. 17/041,426, filed as application No. PCT/KR2019/004403 on Apr. 12, 2019, now Pat. No. 11,557,818.

(30) Foreign Application Priority Data

May 15, 2018 (KR) .................. 10-2018-0055656

(51) Int. Cl.
  *H01M 10/6556* (2014.01)
  *H01M 10/613* (2014.01)
  (Continued)

(52) U.S. Cl.
  CPC ..... *H01M 10/6556* (2015.04); *H01M 10/613* (2015.04); *H01M 10/647* (2015.04);
  (Continued)

(58) Field of Classification Search
  CPC ............. H01M 10/613; H01M 10/625; H01M 10/643; H01M 10/647; H01M 10/6554;
  (Continued)

(56) References Cited

U.S. PATENT DOCUMENTS

| | | |
|---|---|---|
| 8,003,245 B2 | 8/2011 | Lee et al. |
| 9,337,457 B2 | 5/2016 | Yajima et al. |

(Continued)

FOREIGN PATENT DOCUMENTS

| | | |
|---|---|---|
| CN | 102299363 A | 12/2011 |
| EP | 1 143 541 A1 | 10/2001 |

(Continued)

OTHER PUBLICATIONS

International Search Report for corresponding International Application No. PCT/KR2019/004403, dated Jul. 22, 2019, 2pp.

(Continued)

*Primary Examiner* — Lingwen R Zeng
(74) *Attorney, Agent, or Firm* — Womble Bond Dickinson (US) LLP

(57) ABSTRACT

A battery pack of the present disclosure includes: battery cells each including a terminal surface on which an electrode terminal is formed, a top surface which is opposite the terminal surface, and a lateral surface which is between the terminal surface and the top surface; a first tank facing the terminal surfaces of the battery cells; a second tank extending from the first tank and facing the lateral surfaces of the battery cells; and a third tank extending from the second tank and facing the top surfaces of the battery cells, and a cavity may be formed in the first to third tanks to extend across the first to third tanks, and the cavity may be filled with a first cooling medium and may be fluidically isolated from outside of the battery pack, and a cooling tube may be accommodated in the third tank to extend across the cavity.

23 Claims, 14 Drawing Sheets

(51) Int. Cl.
  *H01M 10/647* (2014.01)
  *H01M 10/6568* (2014.01)
  *H01M 50/209* (2021.01)
  *H01M 10/625* (2014.01)
  *H01M 10/643* (2014.01)
  *H01M 10/6554* (2014.01)
  *H01M 10/6557* (2014.01)
  *H01M 10/6567* (2014.01)
  *H01M 50/213* (2021.01)

(52) U.S. Cl.
  CPC ..... *H01M 10/6568* (2015.04); *H01M 50/209* (2021.01); *H01M 10/625* (2015.04); *H01M 10/643* (2015.04); *H01M 10/6554* (2015.04); *H01M 10/6557* (2015.04); *H01M 10/6567* (2015.04); *H01M 50/213* (2021.01); *H01M 2220/20* (2013.01)

(58) Field of Classification Search
  CPC ......... H01M 10/6556; H01M 10/6557; H01M 10/6567; H01M 10/6568; H01M 2220/20; H01M 50/209; H01M 50/213; Y02E 60/10
  See application file for complete search history.

(56) References Cited

U.S. PATENT DOCUMENTS

| | | | |
|---|---|---|---|
| 9,385,404 | B2 | 7/2016 | Yoon et al. |
| 9,673,490 | B2 | 6/2017 | Kim et al. |
| 2004/0201366 | A1 | 10/2004 | Kimoto et al. |
| 2011/0305935 | A1 | 12/2011 | Yoon |
| 2012/0021260 | A1 | 1/2012 | Yasui et al. |
| 2013/0149583 | A1 | 6/2013 | Kurita |
| 2015/0207115 | A1* | 7/2015 | Wondraczek ..... H01M 10/6556 429/99 |
| 2015/0295286 | A1 | 10/2015 | Ahn et al. |
| 2017/0229747 | A1* | 8/2017 | Jung ................. H01M 10/613 |
| 2018/0034021 | A1 | 2/2018 | Yamamoto et al. |
| 2018/0123159 | A1 | 5/2018 | Kim |
| 2020/0321666 | A1 | 10/2020 | Kim |

FOREIGN PATENT DOCUMENTS

| | | |
|---|---|---|
| EP | 2 530 778 A1 | 12/2012 |
| JP | 2009-170259 A | 7/2009 |
| JP | 2012-104339 A | 5/2012 |
| JP | 5354846 B2 | 11/2013 |
| KR | 10-0648705 B1 | 11/2006 |
| KR | 10-2009-0047927 A | 5/2009 |
| KR | 10-1084224 B1 | 11/2011 |
| KR | 10-2012-0069567 A | 6/2012 |
| KR | 10-2014-0058730 A | 5/2014 |
| KR | 10-2015-0118831 A | 10/2015 |
| KR | 10-1658517 B1 | 9/2016 |
| KR | 10-1690575 B1 | 12/2016 |
| KR | 10-2018-0048030 A | 5/2018 |
| WO | WO 2017/204458 A1 | 11/2017 |

OTHER PUBLICATIONS

Extended European Search Report dated Jan. 25, 2022 issued in EP Application No. 19803849.9, 5 pages.
Chinese Office Action dated Nov. 14, 2023 issued in corresponding Chinese Patent Application No. 201980032388.4 (16 pages, including 9 pages of English translation).

* cited by examiner

BATTERY PACK

CROSS-REFERENCE TO RELATED APPLICATIONS

This application is a continuation-in-part of U.S. patent application Ser. No. 17/041,426, filed on Sep. 24, 2020, which is a U.S. National Phase Patent Application of International Application Number PCT/KR2019/004403, filed on Apr. 12, 2019, which claims priority to Korean Patent Application Number 10-2018-0055656, filed on May 15, 2018, the entire contents of all of which are incorporated herein by reference.

FIELD

The present disclosure relates to a battery pack.

BACKGROUND

In general, secondary batteries refer to batteries that can be repeatedly charged and recharged unlike non-rechargeable primary batteries. Secondary batteries are used as energy sources of devices such as mobile devices, electric vehicles, hybrid vehicles, electric bicycles, or uninterruptible power supplies. Secondary batteries are individually used or secondary battery modules (battery packs) each including a plurality of secondary batteries connected as one unit are used according to the types of external devices using secondary batteries.

Unlike small mobile devices such as cellular phones each operable for a certain period of time using a single battery, devices such as electric vehicles or hybrid vehicles having long operation times and consuming large amounts of electricity may prefer battery modules (battery packs) each including a plurality of batteries to handle problems relating to power and capacity, and the output voltages or currents of battery modules may be increased by adjusting the number of batteries included in each battery module.

SUMMARY

An embodiment of the present disclosure includes a battery pack improved in heat dissipation efficiency by using a liquid cooling medium contained to face different surfaces of the battery pack.

An embodiment of the present disclosure includes a battery pack configured to realize high heat dissipation efficiency with relatively low costs through a simple high-efficiency heat dissipation structure.

A battery pack of the present disclosure includes: battery cells each including a terminal surface on which an electrode terminal is formed, a top surface which is opposite the terminal surface, and a lateral surface which is between the terminal surface and the top surface; a first tank facing the terminal surfaces of the battery cells; a second tank extending from the first tank and facing the lateral surfaces of the battery cells; and a third tank extending from the second tank and facing the top surfaces of the battery cells, wherein a cavity is formed in the first to third tanks to extend across the first to third tanks, and the cavity is filled with a first cooling medium and is fluidically isolated from outside of the battery pack, wherein a cooling tube is accommodated in the third tank to extend across the cavity, and the cooling tube accommodates flow of a second cooling medium different from the first cooling medium.

According to the present disclosure, battery cell cooling efficiency may be improved by using cooling media which are contained in first to third tanks to face different surfaces of battery cells, and realizing a fluid cooling system with a cooling medium having a relatively high heat capacity.

According to the present disclosure, since a cooling medium contained in the first and second tanks relatively close to electrode terminals are allowed to naturally convect at a relatively low flow speed or dissipate heat in a static state in which the flow speed of the cooling medium is substantially zero, it may be unnecessary to provide a duct structure for introducing or discharging the cooling medium or a fluid pump for forcing the cooling medium to circulate. Therefore, heat dissipation efficiency may be improved using the cooling medium having a relatively high heat capacity while decreasing the possibility of a short circuit at the electrode terminals caused by leakage or accumulation of the cooling medium, and high heat dissipation efficiency may be realized with low costs owing to simplification in structure.

DETAILED DESCRIPTION

Figure 1:
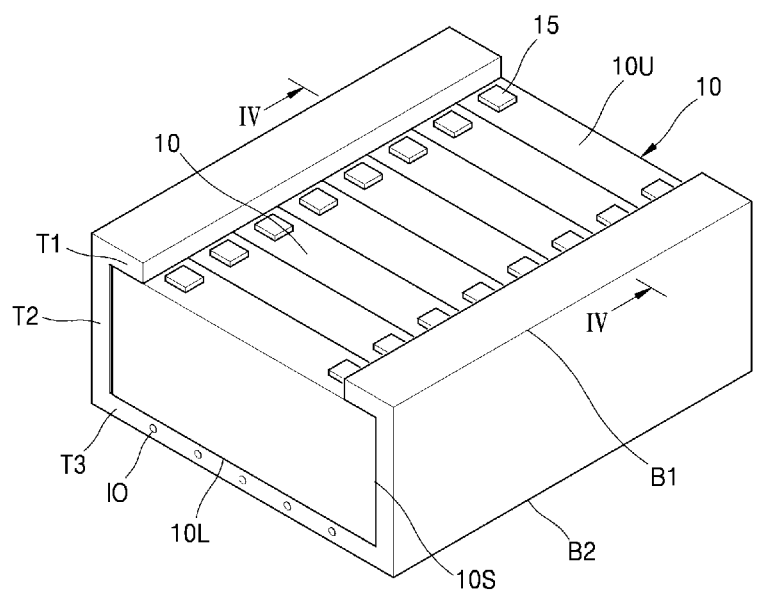
FIG. 1 is a perspective view illustrating a battery pack according to a preferred embodiment of the present disclosure.

A battery pack of the present disclosure includes: battery cells each including a terminal surface on which an electrode terminal is formed, a top surface which is opposite the terminal surface, and a lateral surface which is between the terminal surface and the top surface; a first tank facing the terminal surfaces of the battery cells; a second tank extending from the first tank and facing the lateral surfaces of the battery cells; and a third tank extending from the second tank and facing the top surfaces of the battery cells, wherein a cavity is formed in the first to third tanks to extend across the first to third tanks, and the cavity is filled with a first cooling medium and is fluidically isolated from outside of the battery pack, wherein a cooling tube is accommodated in the third tank to extend across the cavity, and the cooling tube accommodates flow of a second cooling medium different from the first cooling medium.

For example, the cavity may extend continuously from the first tank to the third tank across the second tank.

For example, the cavity in the first tank may face the terminal surfaces of the battery cells, the cavity in the second tank may face the lateral surfaces of the battery cells, and the cavity in the third tank may face the top surfaces of the battery cells.

For example, the battery cells may be disposed such that the terminal surfaces of the battery cells may be on a lower side and the top surfaces of the battery cells are on an upper side in a vertical direction corresponding to a direction of gravity.

For example, the first tank may be a high-temperature region, and the third tank may be a low-temperature region, wherein the first cooling medium may expand as being heated in the cavity of the first tank disposed on the lower side and may receive upward pressure, and the first cooling medium may contract as being cooled in the cavity of the third tank disposed on the upper side and may receive downward pressure, such that the first cooling medium may naturally convect between the first tank and the third tank.

For example, the first to third tanks may continuously surround the terminal surfaces, the lateral surfaces, and the top surfaces of the battery cells around cross-sectional surfaces of the battery cells, and the cooling tube may extend in an arrangement direction of the battery cells, the arrangement direction crossing the cross-sectional surfaces of the battery cells.

For example, the cooling tube may extend across the battery cells in the arrangement direction of the battery cells to cross the first to third tanks extending around the cross-sectional surfaces of the battery cells.

For example, the first to third tanks may each include an inner wall which faces the battery cells and an outer wall which is opposite the battery cells, and a width of the cavity between the inner wall and the outer wall may be greater than a total width of the inner wall and the outer wall.

For example, flow guides may be formed in the cavity to guide a flow direction of the first cooling medium.

For example, the flow guides may be formed in the cavity of the second tank.

For example, the flow guides may extend in a vertical direction in which the terminal surfaces of the battery cells face the top surfaces of the battery cells.

For example, the flow guides may obliquely extend to follow an arrangement direction of the battery cells and a vertical direction in which the terminal surfaces of the battery cells face the top surfaces of the battery cells.

For example, the flow guides may include ribs configured to guide the flow direction of the first cooling medium.

For example, the battery cells may include a plurality of battery cells, and flow paths filled with the first cooling medium and the ribs may be alternately arranged in the second tank in an arrangement direction of the plurality of battery cells.

For example, the flow guides may include reinforcement blocks configured to guide the flow direction of the first cooling medium, limit volume of the first cooling medium, and reinforce rigidity of the second tank in which the flow guides are formed.

For example, the battery cells may include a plurality of battery cells, and flow paths filled with the first cooling medium and the reinforcement blocks may be alternately arranged in the second tank in an arrangement direction of the plurality of battery cells.

For example, in a direction perpendicular to an extension direction of the reinforcement blocks, a width of the reinforcement blocks may be equal to or greater than a width of flow paths filled with the first cooling medium.

For example, flow modification portions may be formed in the cavity to change a flow type of the first cooling medium flowing in the cavity.

For example, the flow modification portions may include a plurality of flow modification portions isolated from each other and formed in a uniform pattern.

For example, the first cooling medium accommodated in the cavity and the second cooling medium accommodated in the cooling tube may have different heat capacities.

For example, the heat capacity of the first cooling medium may be greater than the heat capacity of the second cooling medium.

For example, the first cooling medium may naturally convect in the cavity, and the second cooling medium may forcedly convect in the cooling tube.

For example, a flow rate of the second cooling medium may be greater than a flow rate of the first cooling medium.

Hereinafter, a battery pack will now be described according to preferred embodiments of the present disclosure with reference to the accompanying drawings.

Figure 2:
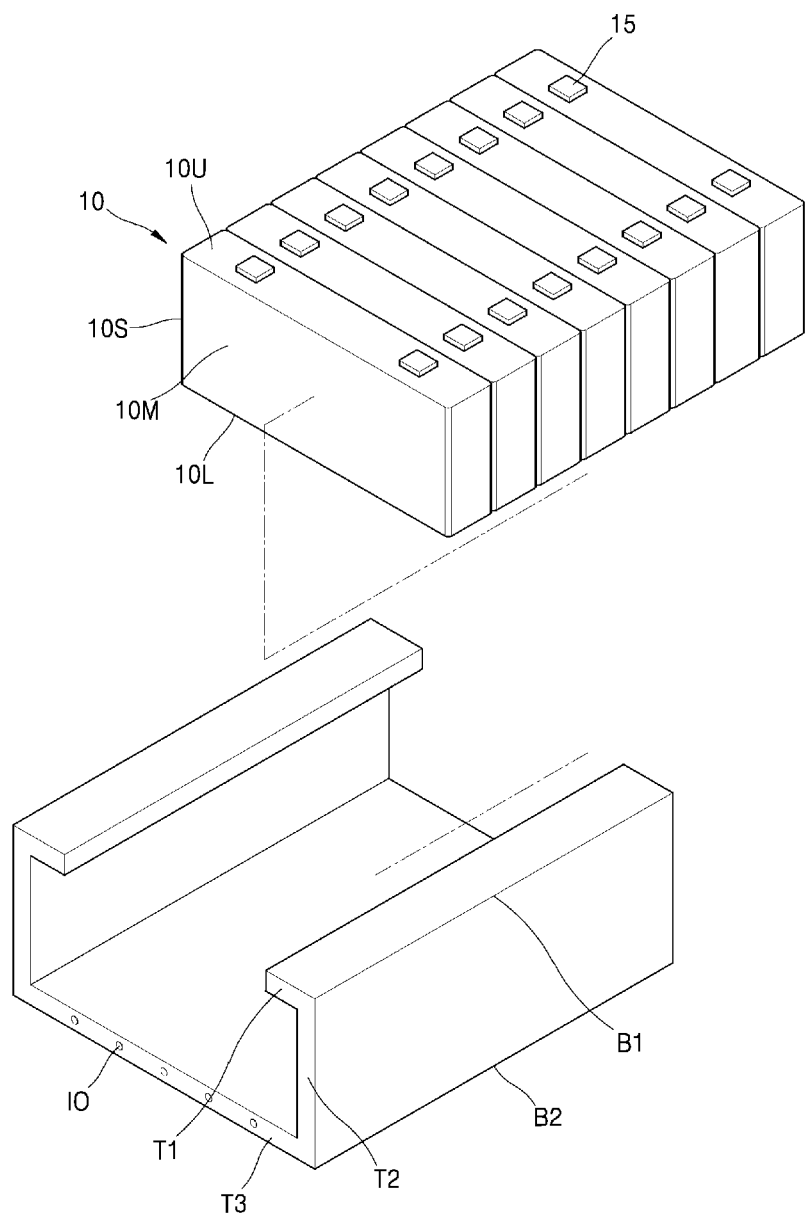
FIG. 2 is an exploded perspective view illustrating the battery pack illustrated in FIG. 1.
Figure 3:
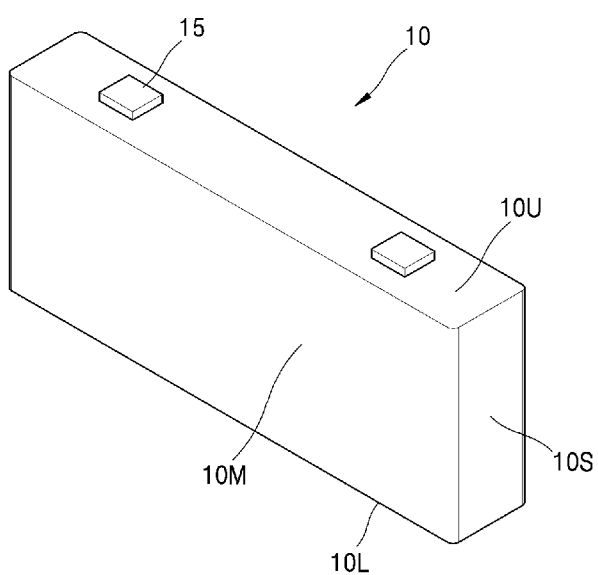
FIG. 3 is a perspective view illustrating a battery cell illustrated in FIG. 1.
Figure 4:
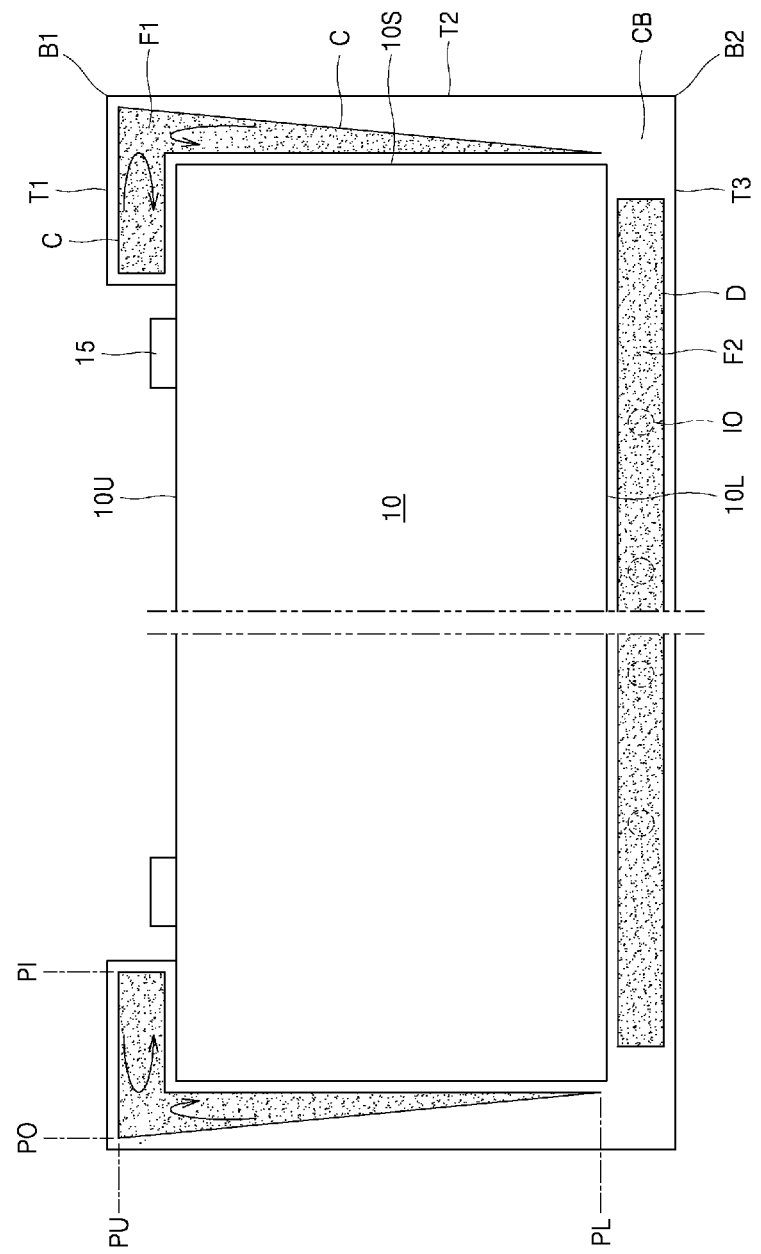
FIG. 4 is a cross-sectional view taken along line IV-IV of FIG. 1.
Figure 5:
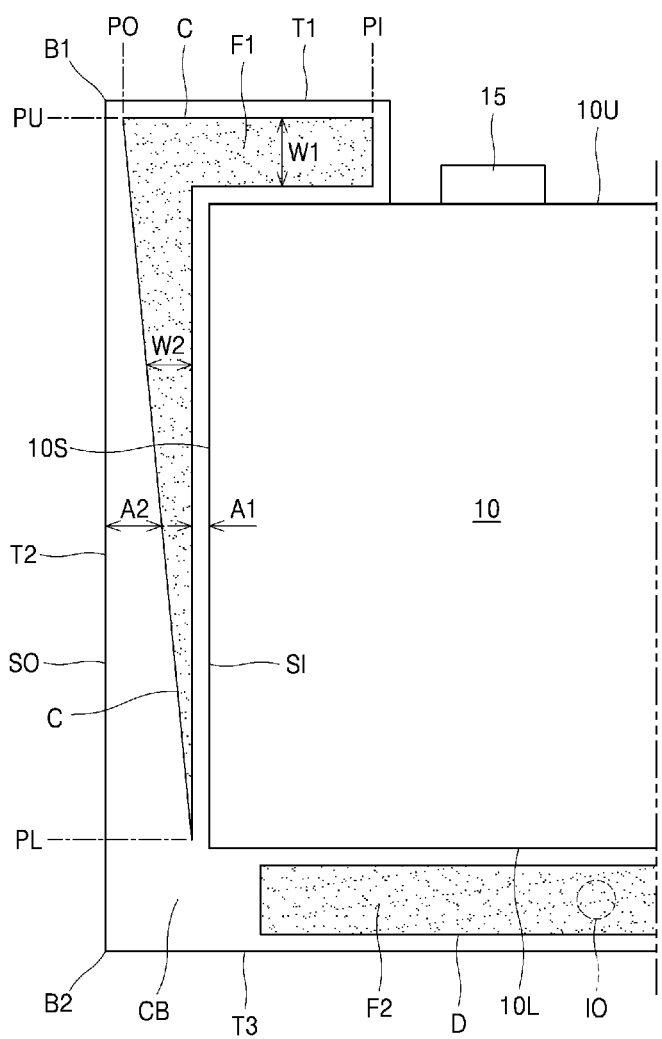
FIG. 5 is an enlarged view illustrating a portion of FIG. 4.

FIG. 1 is a perspective view illustrating a battery pack according to a preferred embodiment of the present disclosure. FIG. 2 is an exploded perspective view illustrating the battery pack shown in FIG. 1. FIG. 3 is a perspective view illustrating a battery cell illustrated in FIG. 1. FIG. 4 is a cross-sectional view taken along line IV-IV of FIG. 1. FIG. 5 is an enlarged view illustrating a portion of FIG. 4.

Referring to the drawings, the battery pack may include: a plurality of battery cells 10; and first, second, and third tanks T1, T2, and T3 which surround the battery cells 10. The first, second, and third tanks T1, T2, and T3 may be arranged around the battery cells 10 and may dissipate heat from the battery cells 10 at different positions around the battery cells 10, and for dissipating heating from the battery cells 10, the first, second, and third tanks T1, T2, and T3 may accommodate cooling media having high heat capacities. As described later, the first, second, and third tanks T1, T2, and T3 may dissipate heat from the battery cells 10 by a liquid cooling method using first and second cooling media F1 and F2 which have relatively high heat capacities instead of using gases such air.

The first, second, and third tanks T1, T2, and T3 may be formed in one piece to have a continuous structure. For example, the first, second, and third tanks T1, T2, and T3 may be formed as one part through, for example, one process such as a high-pressure die casting process instead of forming the first, second, and third tanks T1, T2, and T3 as individual parts and then combining the first, second, and third tanks T1, T2, and T3 with each other.

In particular, each pair of the first and second tanks T1 and T2 may share one cavity C (refer to FIG. 4) that is continuously formed, and to prevent leakage of the first cooling medium F1 (refer to FIG. 4) filled in the cavity C (refer to FIG. 4), each pair of the first and second tanks T1 and T2 may be formed as one part to maintain the fluid tightness of the cavity C (refer to FIG. 4). Since the first and second tanks T1 and T2 are positioned relatively close to electrode terminals 15 at which charge-discharge current is concentrated, it is needed to tightly seal the first cooling medium F (refer to FIG. 4) to prevent a short circuit caused by leakage of the first cooling medium F1 (refer to FIG. 4), and thus at least the first and second tanks T1 and T2 may be continuously connected to each other in a seamless form without any joints therebetween.

The first and second tanks T1 and T2 may be connected to each other with first bent portions B1 as boundaries therebetween, and may extend in different directions from the first bent portions B1 to face different surfaces of the battery cells 10. Similarly, the second and third tanks T2 and T3 may be connected to each other with second bent portions B2 as boundaries therebetween, and may extend in different directions from the second bent portions B2 to face different surfaces of the battery cells 10.

Referring to FIG. 3, each of the battery cells 10 may include: a terminal surface 10U on which electrode terminals 15 are formed; a bottom surface 10L which is opposite the terminal surface 10U; main surfaces 10M which extend between the terminal surface 10U and the bottom surface 10L and having a relatively large area; and lateral surfaces 10S which extend between the terminal surface 10U and the bottom surface 10L and having a relatively small area.

Each of the battery cells 10 may be formed in a substantially rectangular parallelepiped shape including a terminal surface 10U, a bottom surface 10L, a pair of main surfaces 10M, and a pair of lateral surfaces 10S. The battery cells 10 may be arranged in one direction, and in this case, the main surfaces 10M of neighboring battery cells 10 may face each other.

The first, second, and third tanks T1, T2, and T3 may surround the terminal surfaces 10U, the bottom surfaces 10L, and the lateral surfaces 10S between the terminal surfaces 10U and the bottom surfaces 10L, that is, may surround four different surfaces 10U, 10S, and 10L except the main surfaces 10M which face each other in the arrangement direction of the battery cells 10.

The first, second, and third tanks T1, T2, and T3 may be formed in one piece, and since the first, second, and third tanks T1, T2, and T3 surrounding the four different surfaces 10U, 10S, and 10L of the battery cells 10 are formed in one piece, structures for joining individual members may not be required, thereby guaranteeing simplicity in structure.

The assembly of the battery pack will be described below with reference to FIG. 2. That is, the first, second, and third tanks T1, T2, and T3 formed in one piece to surround the four different surfaces 10U, 10S, 10L except the main surfaces 10M which face each other in the arrangement direction of the battery cells 10 may first be prepared; the battery cells 10 may be assembled by sliding the battery cells 10 in one direction (corresponding to the arrangement direction) into the first, second, and third tanks T1, T2, and T3 that are open in the direction (corresponding to the arrangement direction); and a pair of end plates (not shown) may be placed on one open end and the other open end of the first, second, and third tanks T1, T2, and T3 in the direction (corresponding to the arrangement direction) as finishing member for the open ends of the first, second, and third tanks T1, T2, and T3.

Referring to FIGS. 4 and 5, the first tanks T1 may be arranged to face the terminal surfaces 10U of the battery cells 10. Since charge-discharge current is concentrated on the terminal surfaces 10U of the battery cells 10, and the electrode terminals 15 connected to electrode assemblies (not shown) provided inside the battery cells 10 are formed on the terminal surfaces 10U, the generation of heat may be concentrated on the terminal surfaces 10U of the battery cells 10, and thus it may be required to dissipate heat mainly from the terminal surfaces 10U of the battery cells 10. The first tanks T1 may be arranged to face the terminal surfaces 10U of the battery cells 10 and dissipate heat from the terminal surfaces 10U of the battery cells 10 at a close distance.

A pair of electrode terminals 15 facing each other may be formed on the terminal surface 10U of each of the battery cells 10, and the first tanks T1 may be arranged outside the pair of electrode terminals 15. For example, the first tanks T1 may not entirely cover the terminal surface 10U of each of the battery cells 10, but may cover a portion of the terminal surface 10U, that is, only outer regions of the terminal surface 10U. Since the first tanks T1 selectively cover the outer regions of the terminal surface 10U as described above, the pair of electrode terminals 15 may be exposed from the first tanks T1 in an inner region of the terminal surface 10U, and bus bars (not shown) may be coupled to the exposed electrode terminals 15 to electrically connect the electrode terminals 15 with electrode terminals 15 of adjacent battery cells 10.

The first tanks T1 may extend from inner positions PI relatively adjacent to the electrode terminals 15 to outer positions PO relatively distant from the electrode terminals 15, and the cavities of the first tanks T1 may have a uniform width W1 (refer to FIG. 5) from the inner positions PI to the outer positions PO. In this case, the width W1 of the cavities C of the first tanks T1 may be measured in a direction perpendicular to the terminal surface 10U of each of the battery cells 10 which face the first tanks T1.

Since the first tanks T1 are arranged to face the terminal surfaces 10U requiring dissipation of a relatively large amount of heat and have relatively small lengths limited within the outer regions of the battery cells 10 so as not to cover the electrode terminals 15, it is preferable that the first cooling medium F1 be contained in the cavities C in a sufficient amount for coping with heat dissipation requirements, and the cavities C of the first tanks T1 may have a uniform width W1 from the inner positions PI close to the electrode terminals 15 to the outer positions PO distant from the electrode terminals 15. When the cavities C of the first tanks T1 have a nonuniform width W1, heat may be poorly dissipated in a region in which the width W1 is relatively small because of an insufficient amount of the first cooling medium F1.

The first tanks T1 are responsible for dissipation of heat from the terminal surfaces 10U of the battery cells 10 at positions close to the terminal surfaces 10U of the battery cells 10. As described later, the first, second, and third tanks T1, T2, and T3 are thermally connected to each other and cooperate with each other for dissipating heat from the battery cells 10, and heat of the terminal surfaces 10U may be transferred to the second and third tanks T2 and T3 through the first tanks T1 closest to the terminal surfaces 10U and may then be finally dissipated to the outside of the battery pack through the third tank T3.

The second tanks T2 may be arranged to face the lateral surfaces 10S of the battery cells 10. The second tanks T2 may extend through the first bent portions B1 from the first tanks T1 facing the terminal surfaces 10U of the battery cells 10 to face the lateral surfaces 10S of the battery cells 10. The second tanks T2 may be arranged to face the lateral surfaces 10S of the battery cells 10 and may dissipate heat from the lateral surfaces 10S of the battery cells 10 at a close distance from the lateral surfaces 10S of the battery cells 10.

Each of the second tanks T2 may share one cavity C with one first tank T1, and the cavities C may extend across the first and second tanks T1 and T2 to fluidically connect the first and second tanks T1 and T2 to each other. For example, the cavities C may extend through the first bent portions B1 forming boundary regions between the first and second tanks T1 and T2 to fluidically connect the first and second tanks T1 and T2 to each other and thus to allow a fluid to flow between the first and second tanks T1 and T2. In the present specification, the expression "the cavities C extend across the first and second tanks T1 and T2," or "the cavities C extend through the first and second tanks T1 and T2" may mean that the cavities C fluidically connect the first and second tanks T1 and T2 through the boundaries between the first and second tanks T1 and T2.

The first cooling medium F1 filled in the cavities C may allow direct heat transfer between the first and second tanks T1 and T2 while moving in the cavities C by natural convection. For example, since the first and second tanks T1 and T2 are fluidically connected to each other, natural convection in the first tanks T1 and natural convection in the second tanks T2 may affect each other, and this may mean that: natural convection in the first tanks T1 and natural convection in the second tank T2 may come into direct contact with each other or mix with each other to result in heat exchange; or heat transfer may occur between the first and second tanks T1 and T2 by natural convection of the first cooling medium F1 filled in the cavities C extending through the first and second tanks T1 and T2.

Since the first tanks T1 face the terminal surfaces 10U on which heat is concentrated, the first tanks T1 may absorb heat from the terminal surfaces 10U at a close distance from the terminal surfaces 10U, and the first cooling medium F1 which has absorbed heat from the terminal surfaces 10U may transfer the heat to the second tanks T2 by natural convection. The first and second tanks T1 and T2 may be connected to each other through the first bent portions B1 and may extend in difference directions from the first bent portions B1 to respectively face the terminal surfaces 10U and the lateral surfaces 10S of the battery cells 10. In this case, the cavities C of the first and second tanks T1 and T2 may penetrate the first bent portions B1 to fluidically connect the first and second tanks T1 and T2 to each other.

Natural convection may occur due to thermal imbalance between the first and second tanks T1 and T2, and for example, natural convection in the first tank T1 and natural convection in the second tank T2 may occur in opposite directions like clockwise and counterclockwise circulations and may meet and mix with each other at the first bent portions B1. For example, in the cavities C extending through the first and second tanks T1 and T2, one flow may be formed by natural convection, or circulations may be formed in opposite directions by natural convection and may meet and mix with each other at the first bent portions B1.

The cavities C extending through the first and second tanks T1 and T2 are filled with the first cooling medium F1, and thermal imbalance may occur in the cavities C according to the distances from the electrode terminals 15 at which heat is intensively generated such that the first cooling medium F1 may directly transfer heat by natural convection. For example, heat may transfer between the first and second tanks T1 and T2 by natural convection in the cavities C extending through the first and second tanks T1 and T2. That is, heat may transfer from the first tanks T1 to the second tanks T2, and thus heat may transfer from the terminal surfaces 10U through the first and second tanks T1 and T2 to the third tank T3 which is thermally connected to the second tanks T2 such that the heat may be finally dissipated to the outside of the battery pack through the third tank T3.

The second tanks T2 may extend from upper positions PU close to the first tanks T1 to lower positions PL close to the third tank T3. In this case, the cavities C of the second tanks T2 may have a width W2 (refer to FIG. 5) that gradually decreases from the upper positions PU to the lower positions PL. Here, the width W2 of the cavities C of the second tanks T2 may be measured in a direction perpendicular to the lateral surfaces 10S of the battery cells 10 facing the second tanks T2.

The second tanks T2 may be arranged to face the lateral surfaces 10S of the battery cells 10, and may have inner walls SI facing the battery cells 10 and outer walls SO which are opposite the battery cells 10, wherein the width between the inner walls SI and the outer walls SO of the second tanks T2 may be uniform from the upper positions PU to the lower positions PL. Here, the width of the second tanks T2 may be measured in a direction perpendicular to the lateral surfaces 10S of the battery cells 10 facing the second tanks T2.

The second tanks T2 may have a uniform width from the upper positions PU to the lower positions PL, and the cavities C formed in the second tanks T2 may have a width W2 which gradually decreases in a direction from the upper positions PU to the lower positions PL. This structure may be formed by adjusting a first thickness A1 (refer to FIG. 5) between the inner walls SI and the cavities C of the second tanks T2 to be uniformly thin to bring the cavities C of the second tanks T2 as close as possible to the battery cells 10 (more specifically, the lateral surfaces 10S of the battery cells 10), and adjusting a second thickness A2 (refer to FIG. 5) between the outer walls SO and the cavities C of the second tanks T2 to gradually increase from the upper positions PU to the lower positions PL for varying the width W2 of the cavities C in a direction from the upper positions PU to the lower positions PL.

For example, the cavity C of each of the second tanks T2 may have a right-angled triangular cross-section, and as the hypotenuse of the right-angled triangular cross-section obliquely extends in a direction from a vertex located at the upper position PU to a vertex located at the lower positions PL, the width W2 of the cavity C may gradually decrease. The first cooling medium F1 may be filled in the cavities C, and since the width W2 of the cavities C are designed to be different at the upper positions PU and the lower positions PL, the volume of the first cooling medium F1 filled in the cavies C may be differentially changed. That is, the volume of the first cooling medium F1 may change from a maximum value to a minimum value in a direction from the upper positions PU to the lower positions PL, and in the manner, the volume of the first cooling medium F1 may be differentially designed according to the amounts of heat to be dissipated at different positions.

Heat may be relatively intensively generated in the electrode terminals 15 of the battery cells 10 in which charge-discharge currents is concentrated. By considering this, heat may be differentially dissipated from the upper positions PU close to the electrode terminals 15 by adjusting the width W2 of the cavities C of the second tanks T2 to be relatively great at the upper positions PU. That is, the upper positions PU at which the need for heat dissipation is relatively great may face a relatively great width W2 of the cavities C and may thus face the maximum volume of the first cooling medium F1. In addition, the lower positions PL at which the need for heat dissipation is relatively low may face a relatively small width W2 of the cavities C and may thus face the minimum volume of the first cooling medium F1.

The cavities C may extend through the first and second tanks T1 and T2 and may have different shapes in the first and second tanks T1 and T2. That is, the cavities C of the first tanks T1 may have a uniform width W1 from the inner positions PI relatively close to the electrode terminals 15 to the outer positions PO relatively distant from the electrode terminals 15. The cavities of the first tanks T1 facing the terminal surfaces 10U may have a uniform width W1 such that the first cooling medium F1 may be provided in a sufficient amount for the terminal surfaces 10U having a relatively high heat dissipation demand. When the cavities C of the first tanks T1 have a nonuniform width W1, since the first tanks T1 have a relatively small length covering outer regions of the terminal surfaces 10U, the amount of the first cooling medium F1 may be insufficient at some positions to result in poor heat dissipation. Thus, the cavities C of the first tanks T1 may be formed to have a uniform width W1.

The width W2 of the cavities C of the second tanks T2 may be relatively great at the upper positions PU at which the heat dissipation demand is concentrated and may be relatively small at the lower positions PL at which the heat dissipation demand is relatively low, and thus, the volume of the first cooling medium F1 may be differentially designed according to the width W2 of the cavities C which varies from the upper positions to the lower positions PL for efficient distribution of the first cooling medium F1 in accordance with the heat dissipation demand.

The cavities C extending through the first and second tanks T1 and T2 are fluidically isolated, and the first cooling medium F1 is filled in the cavities C. The expression "the cavities C are fluidically isolated" may mean that each of the cavities C is not provided with a structure such as a duct for allowing the introduction and discharge of a fluid. That is, the cavities C may be fluidically isolated, and the first cooling medium F1 may be statically filled in the cavities C without any flow of the first cooling medium F1 into or out of the cavities C. The cavities C extending through the first and second tanks T1 and T2 may be fluidically isolated from the surrounding environment without fluidical connection with the surrounding environment, that is, without any flow of a fluid into or out of the cavities C.

The expression "the cavities C of the first and second tanks T1 and T2 are fluidically isolated" does not mean that the first and second tanks T1 and T2 are thermally insulated from the surrounding environment, and as described later, the first and second tanks T1 and T2 are thermally connected to the third tank T3 such that the first and second tanks T1 and T2 may exchange heat with the third tank T3 through heat conduction blocks CB. For example, the first and second tanks T1 and T2 are not fluidically connected to the third tank T3, and thus direct convection for heat transfer does not occur therebetween. However, since the first and second tanks T1 and T2 are thermally connected to the third tank T3 through the heat conduction blocks CB, heat transfer may occur therebetween by conduction. As described later, since the heat conduction blocks CB are provided between the first cooling medium F1 of the first and second tanks T1 and T2 and the second cooling medium F2 of the third tank T3, heat transfer may occur between the first and second cooling media F1 and F2, and heat transferred from the first cooling medium F1 may be dissipated to the outside of the battery pack through the second cooling medium F2 by convection forced by a fluid pump (not shown).

Natural convection may occur in the cavities C due to thermal imbalance, and the first cooling medium F1 may naturally convect at a low flow speed or may absorb heat in a stationary state in which the flow speed of the first cooling medium F1 is almost zero. As described above, in the cavities C, the first cooling medium F1 naturally convects at a low flow speed or absorbs heat in a stationary state in which the flow speed of the first cooling medium F1 is almost zero, and thus it is preferable that a fluid having a high heat capacity be used as the first cooling medium F1. As described later, the first cooling medium F1 of the first and second tanks T1 and T2 may be a fluid having a heat capacity greater than the heat capacity of the second cooling medium F2 of the third tank T3. This will be described in more detail later.

The first cooling medium F1 does not flow into or out of the cavities C and is not forced to convect by a fluid pump, but is simply contained in the cavities C in a static state. That is, it is not needed to provide the first and second tanks T1 and T2 with a duct structure for allowing the first cooling medium F1 to flow into or out of the cavities C, or a device such as a fluid pump for forcing the first cooling medium F1 to convect, and thus a simple fluid cooling structure may be provided using the first cooling medium F1.

Since the first and second tanks T1 and T2 in which the first cooling medium F1 is stored are arranged at positions closer to the electrode terminals 15 than the third tank T3 is to the electrode terminals 15, when the first and second tanks T1 and T2 adjacent to the electrode terminals 15 are provided with a structure such as a duct structure or a fluid pump, the possibility of leakage of the first cooling medium F1 stored in the first and second tanks T1 and T2 may increase. When the first cooling medium F1 leaks toward the electrode terminals 15 at which charge-discharge current is concentrated, the possibility of accidents such as an electrical short circuit may increase. Thus, in the present disclosure, fluid cooling is implemented using the first cooling medium F1 having a relatively high heat capacity to efficiently dissipate heat from the electrode terminals 15 having a relatively high heat dissipation demand, but the first and second tanks T1 and T2 storing the first cooling medium F1 are not provided with a duct for introduction or discharge of the first cooling medium F1 or a fluid pump for forcing the first cooling medium F1 to convent so as to prevent leakage of the first cooling medium F1 to the electrode terminals 15, such that the first cooling medium F1 may dissipate heat from the electrode terminals 15 while the first cooling medium F1 naturally convects or absorbs heat at a low flow speed.

The first cooling medium F1 may be a fluid which has a high heat capacity and is electrically insulative. The first cooling medium F1 is filled in the cavities C of the first and second tanks T1 and T2 which are close to the electrode terminals 15. In this case, in the process of injecting the first cooling medium F1 into the cavities C of the first and second tanks T1 and T2, the first cooling medium F1 may leak toward the electrode terminals 15, and when the first cooling medium F1 leaking toward the electrode terminals 15 accumulates on the terminal surfaces 10U, an electrical short circuit may occur between the electrode terminals 15 and other conductive members. Thus, it is preferable that the first cooling medium F1 be electrically insulative. For example, the first cooling medium F1 may be a fluid which is more electrically insulative than the second cooling medium F2 of the third tank T3 which is relatively distant from the electrode terminals 15, and for example, the first cooling medium F1 may be a fluid having electrical conductivity lower than that of the second cooling medium F2.

The third tank T3 may be arranged to face the bottom surfaces 10L of the battery cells 10. The third tank T3 may extend through the second bent portions B2 from the second tanks T2 facing the lateral surfaces 10S of the battery cells 10 to face the bottom surfaces 10L of the battery cells 10. The third tank T3 may be arranged to face the bottom surfaces 10L of the battery cells 10 and may dissipate heat from the bottom surfaces 10L of the battery cells 10 at a close distance from the bottom surfaces 10L of the battery cells 10.

A flow path D for receiving the flow of the second cooling medium F2 different from the first cooling medium F1 may be formed in the third tank T3. The flow path D of the third tank T3 is isolated from the cavities C extending through the first and second tanks T1 and T2 without fluidical connection with the cavities C. That is, the flow path D of the third tank T3 may contain a fluid different from a fluid contained in the cavities C of the first and second tanks T1 and T2, that is, the second cooling medium F2 different from the first cooling medium F1 of the first and second tanks T1 and T2, and the first and second cooling media F1 and F2 may be isolated from each other without being mixed with each other for dissipating heat from different regions of the battery pack. For example, the cavities C extending through the first and second tanks T1 and T2 may be fluidically isolated from the outside of the cavities C without fluidical connection with the third tank T3.

The cavities C extending through the first and second tanks T1 and T2 is not fluidically connected to the flow path D of the third tank T3, but the first and second tanks T1 and T2 are thermally connected to the third tank T3 such that heat may transfer between the first cooling medium F1 of the first and second tanks T1 and T2 and the second cooling medium F2 of the third tank T3 through the heat conduction blocks CB. For example, the heat conduction blocks CB may be formed between the cavities C extending through the first and second tanks T1 and T2 and the flow path D of the third tank T3 as metal blocks having no fluid-containing space. For example, the heat conduction blocks CB may include solid portions of the second tanks T2 in which the cavities C are not formed, and solid portions of the third tank T3 in which the flow path D is not formed.

The heat conduction blocks CB may include the second bent portions B2 which connect the second and third tanks T2 and T3 to each other. The second bent portions B2 may connect the second and third tanks T2 and T3 to each other such that the second tanks T2 facing the lateral surfaces 10S of the battery cells 10 may be connected to the third tank T3 facing the bottom surfaces 10L of the battery cells 10 through the second bent portions B2, and the second and third tanks T2 and T3 may extend from the second bent portions B2 in different directions to respectively face the lateral surfaces 10S and the bottom surfaces 10L of the battery cells 10.

Heat transfer between the second and third tanks T2 and T3 occurs through the heat conduction blocks CB and is thus different from heat transfer between the first and second tanks T1 and T2 which occurs by natural convection. That is, since the second and third tanks T2 and T3 are not fluidically connected to each other, convection heat transfer does not occur between the second and third tanks T2 and T3, but heat transfer occurs between the second and third tanks T2 and T3 through the heat conduction blocks CB which thermally connect the second and third tanks T2 and T3 to each other. That is, the first cooling medium F1 of the second tank T2 and the second cooling medium F2 of the third tank T3 do not come into direct contact with each other or mix with each other, but heat transfer may occur between the first cooling medium F1 and the second cooling medium F2 by conduction through the heat conduction blocks CB.

The third tank T3 may include the flow path D through which the second cooling medium F2 flows, and the second cooling medium F2 may be forced to flow at a certain flow speed by a fluid pump (not shown) such that heat transferred from the second tanks T2 or the bottom surfaces 10L of the battery cells 10 may be dissipated to the outside of the battery pack.

It is preferable that the second cooling medium F2 be a fluid having a relatively high heat capacity for cooling efficiency. That is, it is preferable that both the first cooling medium F1 of the first and second tanks T1 and T2 and the second cooling medium F2 of the third tank T3 be fluids having relatively high heat capacities. Since the first cooling medium F1 transfers heat while naturally convecting at a low flow speed in the cavities C of the first and second tanks T1 and T2 or absorbing heat in the cavities C of the first and second tanks T1 and T2 in a stationary state in which the flow speed of the first cooling medium F1 is almost zero, it is preferable that the first cooling medium F1 be a fluid having a relatively high heat capacity, and since the second cooling medium F2 is forced to flow at a controlled flow speed by the fluid pump, the flow speed of the second cooling medium F2 may be adjusted according to the heat dissipation demand such that the second cooling medium F2 may be a fluid having a heat capacity lower than that of the first cooling medium F1. For example, the average flow speed of the first cooling medium F1 may be less than the average flow speed of the second cooling medium F2, and the first cooling medium F1 may be a fluid having a heat capacity greater than that of the second cooling medium F2 to compensate for a cooling efficiency decrease caused by the flow speed difference.

Since the third tank T3 is arranged at a position more distant from the electrode terminals 15 than the first and second tanks T1 and T2 are from the electrode terminals 15, the possibility of leakage of the second cooling medium F2 to the electrode terminals 15 is relatively low. Therefore, the second cooling medium F2 may be a fluid less electrically insulative than the first cooling medium F1. That is, the second cooling medium F2 may be a fluid having relatively low heat capacity and electrical insulative characteristics compared to the first cooling medium F1. For example, the second cooling medium F2 may be a fluid such as water which is inexpensive compared to the first cooling medium F1.

The second cooling medium F2 may flow in the flow path D of the third tank T3, and the third tank T3 may include an inlet/outlet 10 for introducing the second cooling medium F2 having a low temperature or discharging the second cooling medium F2 having a high temperature. The second cooling medium F2 may circulate along a closed loop path including the flow path D of the third tank T3 or an open loop path including the flow path D of the third tank T3, and in the closed loop path along which the second cooling medium F2 circulates, a cooling unit (not shown) may be provided to cool the second cooling medium F2.

The first, second, and third tanks T1, T2, and T3 may be formed of a metallic material which has high thermal conductivity and high formability for forming spaces for storing fluids such as the cavities C or the flow path D in the first, second, and third tanks T1, T2, and T3. The first, second, and third tanks T1, T2, and T3 may surround four different surfaces 10U, 10S, and 10L of each of the battery cells 10, and may be formed of a metallic material having high heat conductivity for efficient heat transfer from the battery cells 10 to the first and second cooling media F1 and F2. For example, the first, second, and third tanks T1, T2, and T3 may be formed of an aluminum material.

The first, second, and third tanks T1, T2, and T3 may be formed in one piece, and the second tanks T2 connected through the second bent portions B2 to the third tanks T3 facing the bottom surfaces 10L of the battery cells 10 may be provided as a pair facing each other and may face the lateral surfaces 10S of the battery cells 10. In addition, the first tanks T1 connected the through the first bent portions B1 to the second tanks T2 facing the lateral surfaces 10S of the battery cells 10 may be provided as a pair and may face the terminal surfaces 10U of the battery cells 10.

Figure 6:
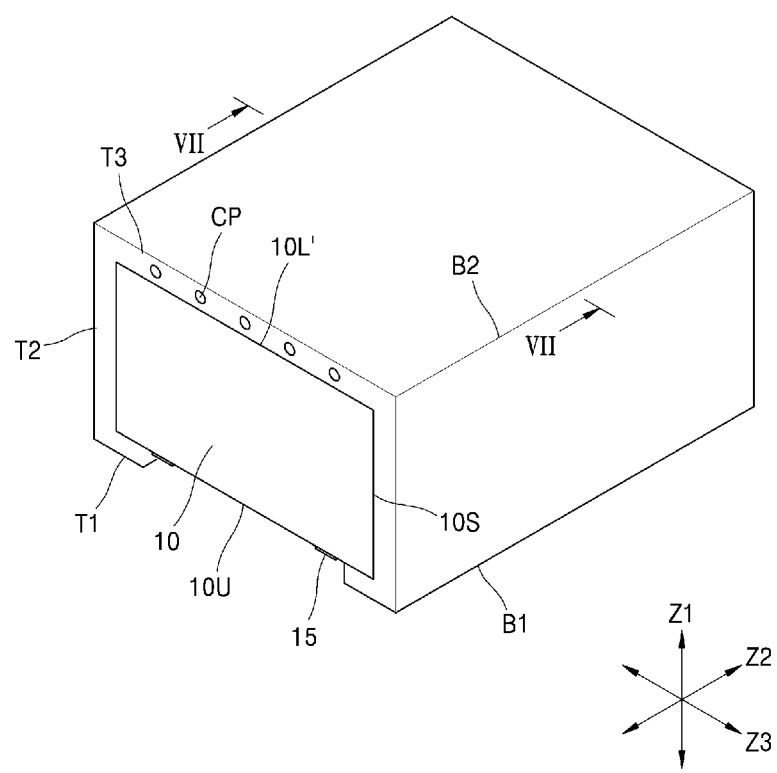
FIG. 6 is a perspective view illustrating a battery pack according to another embodiment of the present disclosure.
Figure 7:
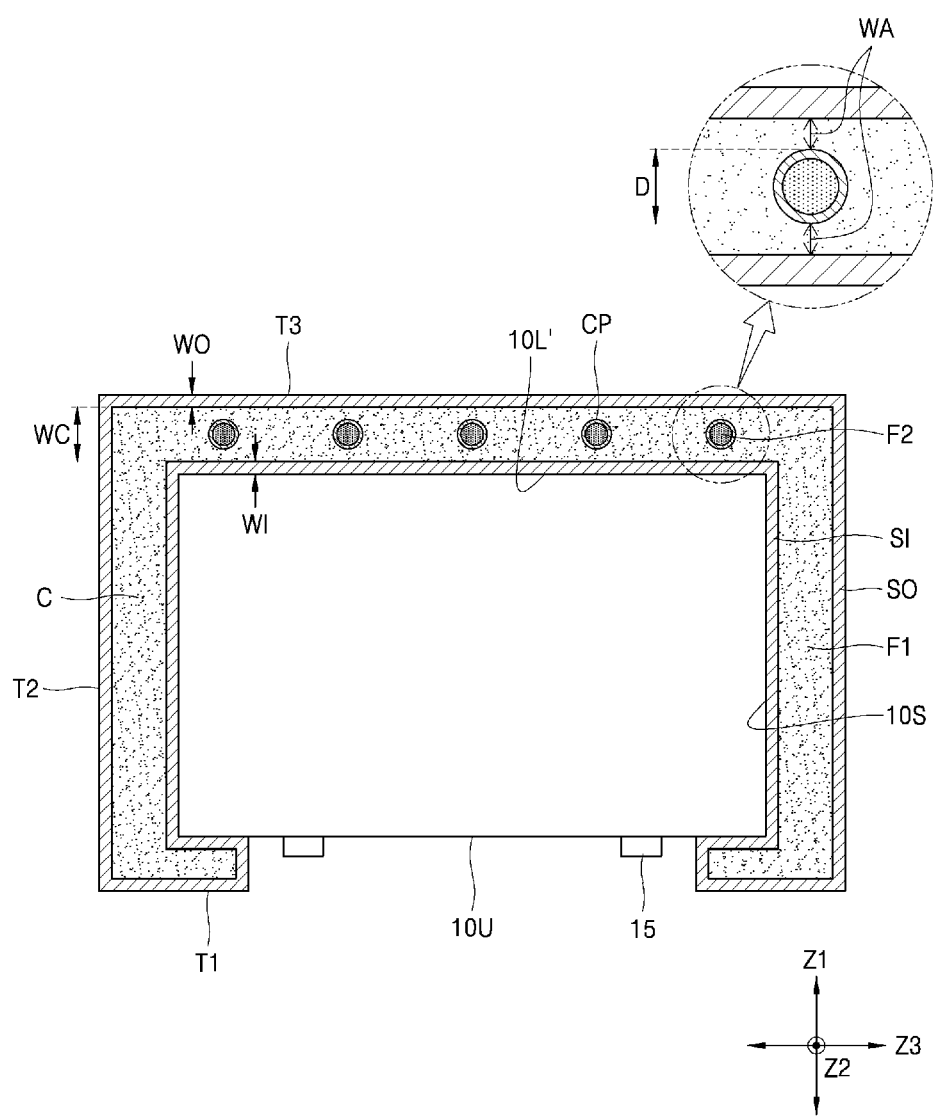
FIG. 7 is a cross-sectional view taken along line VII-VII of FIG. 6.

FIG. 6 is a perspective view illustrating a battery pack according to another embodiment of the present disclosure. FIG. 7 is a cross-sectional view taken along line VII-VII of FIG. 6. FIGS. 8 to 11 are views illustrating flow guides according to various embodiments of the present disclosure. FIG. 12 is a view illustrating flow modification portions according to another embodiment of the present disclosure.

Referring to FIGS. 6 and 7, the battery pack may include: battery cells 10 each including a terminal surface 10U on which an electrode terminal 15 is formed, a top surface 10L' opposite the terminal surface 10U, lateral surfaces 10S between the terminal surface 10U and the top surface 10L'; a first tank T1 facing the terminal surfaces 10U of the battery cells 10; a second tank T2 extending from the first tank T1 and facing the lateral surfaces 10S; and a third tank T3 extending from the second tank T2 and facing the top surfaces 10L', wherein a cavity C may extend continuously in the first, second, and third tanks T1, T2, and T3 and may be fluidically isolated from the outside of the battery pack with a first cooling medium F1 being filled therein, and cooling tubes CP may be accommodated in the third tank T3 across the cavity C to allow a second cooling medium F2 different from the first cooling medium F1 to flow therein.

In detail, referring to FIGS. 6 and 7, the battery pack may include the battery cells 10 and the first, second, and third tanks T1, T2, and T3 surrounding the battery cells 10. For example, the battery cells 10 illustrated in FIGS. 6 and 7 may be turned upside down compared with the battery cells 10 illustrated in FIG. 4. That is, although the terminal surfaces 10U of the battery cells 10 illustrated in FIG. 4 are at an upper position in a vertical direction Z1 corresponding to the direction of gravity, the terminal surfaces 10U of the battery cells 10 illustrated in FIGS. 6 and 7 may be at a lower position in the vertical direction Z1. In detail, the battery cells 10 illustrated in FIGS. 6 and 7 may include the terminal surfaces 10U at lower sides and the top surfaces 10L' at upper sides opposite the terminal surfaces 10U. As described later, because the terminal surfaces 10U in which a relatively large amount of heat accumulates are provided on the lower sides of the battery cells 10 in the vertical direction Z1 corresponding to the direction of gravity, the first tank T1 facing the terminal surfaces 10U is a relatively high-temperature region, and the third tank T3 accommodating the cooling tubes CP is a relatively low-temperature region. Thus, when heated in the lower high-temperature region, the first cooling medium F1 may expand and reduce in specific weight to receive upward force due to buoyancy, and when cooled in the upper low-temperature region, the first cooling medium F1 may contract and reduce in specific gravity to receive downward force. Therefore, the first cooling medium F1 may naturally convect between the first tank T1 corresponding to the high-temperature region and the third tank T3 corresponding to the low-temperature region, and thus heat transfer may occur between the first tank T1 and the third tank T3 owing to the natural convection of the first cooling medium F1.

In an embodiment of the present disclosure, the first, second, and third tanks T1, T2, and T3 may be continuously connected to each other while sharing the cavity C. That is, in an embodiment of the present disclosure, the first, second, and third tanks T1, T2, and T3 may respectively face the terminal surfaces 10U of the battery cells 10, the lateral surfaces 10S of the battery cells 10, and the top surfaces 10L' of the battery cells 10 while surrounding the battery cells 10. In the present specification, the expression "the first, second, and third tanks T1, T2, and T3 share the cavity C" may mean that the first, second, and third tanks T1, T2, and T3 are fluidically connected to each other through the cavity C, and may also mean that the first, second, and third tanks T1, T2, and T3 accommodate a fluid flowing through the first, second, and third tanks T1, T2, and T3.

The first, second, and third tanks T1, T2, and T3 may be disposed around the battery cells 10 and may dissipate heat from the battery cells 10 at different positions around the battery cells 10. For example, the first, second, and third tanks T1, T2, and T3 may accommodate the first cooling medium F1 having a high heat capacity to dissipate heat from the battery cells 10. In an embodiment of the present disclosure, the first, second, and third tanks T1, T2, and T3 may dissipate heat from the battery cells 10 by a liquid-cooling method using the first cooling medium F1 which is a liquid having a high heat capacity instead of using a gas such as air.

The first, second, and third tanks T1, T2, and T3 may be formed in one piece to have a continuous structure. For example, the first, second, and third tanks T1, T2, and T3 may be formed as one part through one process such as a high-pressure die casting process instead of forming the first, second, and third tanks T1, T2, and T3 as individual parts and then combining the first, second, and third tanks T1, T2, and T3 with each other.

In the embodiment shown in FIGS. 6 and 7, the first, second, and third tanks T1, T2, and T3 may share one cavity C that is continuously formed, and to prevent leakage of the first cooling medium F1 filled in the cavity C, the first, second, and third tanks T1, T2, and T3 may be formed as one part to maintain the fluid tightness of the cavity C. Unlike in the embodiment shown in FIG. 4 in which the first and second tanks T1 and T2 share one cavity C, in the embodiment shown in FIGS. 6 and 7, the first, second, and third tanks T1, T2, and T3 continuously surrounding the battery cells 10 may share one cavity C. In an embodiment of the present disclosure, the expression "the first, second, and third tanks T1, T2, and T3 share one cavity C" may mean that a fluid is allowed to flow between the first, second, and third tanks T1, T2, and T3 across the first, second, and third tanks T1, T2, and T3. For example, natural convection of the first cooling medium F1 may be possible from the first tank T1 facing the terminal surfaces 10U of the battery cells 10 to the third tank T3 facing the top surfaces 10L' of the battery cells 10 via the second tank T2 facing the lateral surfaces 10S of the battery cells 10. That is, natural convection of the first cooling medium F1 is possible across the first, second, and third tanks T1, T2, and T3.

In an embodiment of the present disclosure, the first, second, and third tanks T1, T2, and T3 may accommodate natural convection occurring therebetween, and thus owing to natural convection including transfer of a substance, that is, natural convection including transfer of the first cooling medium F1, heat may be dissipated outward from the battery cells 10. For example, in an embodiment of the present disclosure, convection may occur across the first, second, and third tanks T1, T2, and T3, for example, in the vertical direction Z1 corresponding to the direction of gravity. For example, natural convection may occur due to a temperature difference between the first tank T1 facing the terminal surfaces 10U accumulating a relatively large amount of heat and the third tank T3 accommodating the cooling tubes CP. The first cooling medium F1 contained in the first tank T1 (specifically, a portion of the first cooling medium F1 that is close to the terminal surfaces 10U) may decrease in specific weight due to high-temperature expansion and may thus receive upward pressure due to buoyancy such that the first cooling medium F1 may rise from the first tank T1 to the third tank T3 via the second tank T2. Then, the first cooling medium F1 having a relatively high temperature and rising from the first tank T1 to the third tank T3 accommodating the cooling tubes CP may exchange heat with the second cooling medium F2 flowing in the cooling tubes CP and may thus contract into a low-temperature and high-specific-gravity state, thereby receiving downward pressure and flowing down back to the first tank T1. For example, the first cooling medium F1 cooled in the third tank T3 may flow down in the second tank T2 at a position relatively distant from the lateral surfaces 10S (for example, in a horizontal direction Z3), and may make a U-turn in an end portion of the first tank T1 while expanding by receiving heat from the terminal surfaces 10U at a position close to the lateral surfaces 10S (for example, in the horizontal direction Z3) such that the first cooling medium F1 may flow upward to the third tank T3 through the second tank T2 due to a specific gravity difference caused by expansion. That is, in an embodiment of the present disclosure, the first, second, and third tanks T1, T2, and T3 may accommodate natural convection occurring across the first, second, and third tanks T1, T2, and T3. Thus, heat transfer may occur between the first, second, and third tanks T1, T2, and T3 by natural convection, and heat may be dissipated through the cooling tubes CP accommodated in the third tank T3. In the embodiment illustrated in FIGS. 6 and 7, the first, second, and third tanks T1, T2, and T3 may be continuously connected to each other (share the cavity CC continuously formed therein) unlike the example illustrated in FIG. 4 in which the first and second tanks T1 and T2 share the continuous cavity C, and the heat conduction blocks CB are disposed between the second and third tanks T2 and T3 to prevent the formation of a fluidical connection between the second and third tanks T2 and T3. As described above, because the first, second, and third tanks T1, T2, and T3 share the cavity C, natural convection may be possible between the first tank T1 provided in the relatively high-temperature region and the third tank T3 provided in the relatively low-temperature region. In an embodiment of the present disclosure, the first cooling medium F1 may be contained in the first, second, and third tanks T1, T2, and T3, and may be a liquid having a relatively high heat capacity. That is, the first, second, and third tanks T1, T2, and T3 may contain a substantially homogeneous cooling medium (the first cooling medium F1) unlike the embodiment illustrated in FIG. 4 in which the first, second, and third tanks T1, T2, and T3 contain the first and second cooling media F1 and F2 having different characteristics (for example, different thermal characteristics such as different heat capacities) with the heat conduction blocks CB being between the first, second, and third tanks T1, T2, and T3. In an embodiment of the present disclosure, however, the third tank T3 may accommodate the first cooling medium F1 together with the cooling tubes CP in which the second cooling medium F2 having thermal characteristics (for example, heat capacity) different from those of the first cooling medium F1 are contained. In an embodiment of the present disclosure, for example, the first, second, and third tanks T1, T2, and T3 may contain the first cooling medium F1 capable of natural convection across the first, second, and third tanks T1, T2, and T3, and unlike the first and second tanks T1 and T2, the third tank T3 may also accommodate the cooling tubes CP in which the second cooling medium F2 different from the first cooling medium F1 is contained. In an embodiment of the present disclosure, the cavity C, which the first, second, and third tanks T1, T2, and T3 share, may be fluidically isolated without any fluidical connection to the outside of the battery pack and any fluidical entrance/exit connected to the outside of the battery pack. However, the cooling tubes CP accommodated in the third tank T3 may include a fluidical connection to the outside of the battery pack. For example, the cooling tubes CB extending across the third tank T3 may be connected to each other in a closed-loop form through a heat exchanger (not shown) provided outside the battery pack.

In an embodiment of the present disclosure, the cooling tubes CP may include a plurality of cooling tubes CP connected in parallel to each other and a plurality of cooling tubes CP extending parallel to each other to increase a heat transfer area inside the third tank T3. In an embodiment of the present disclosure, for example, the cooling tubes CP may extend parallel to each other in an arrangement direction Z2 of the battery cells 10. In an embodiment of the present disclosure, for example, the cooling tubes CP may extend in the arrangement direction Z2 of the battery cells 10 such that the second cooling medium F2 may flow inside the cooling tubes CP in a direction crossing the direction in which the first cooling medium F1 naturally convects around cross-sectional surfaces of the battery cells 10. The cooling tubes CP may extend across the battery cells 10 in the arrangement direction Z2 of the battery cells 10, that is, the cooling tubes CP may extend in a direction (arrangement direction Z2 of the battery cells 10) crossing the first cooling medium F1 flowing around the cross-sectional surfaces of the battery cells 10, to exchange heat with the natural convection of the first cooling medium F1 flowing along the cross-sectional surfaces of the battery cells 10. In an embodiment of the present disclosure, the term "natural convection" or "the natural convection of the first cooling medium F1" may refer to the flow of the first cooling medium F1 occurring to remove a thermal imbalance condition between the high-temperature region (for example, the first tank T1) and the low-temperature region (for example, the third tank T3) having different temperatures. For example, unlike forced convection driven by an additional fluid machine such as a fluid pump configured to impart a pressure difference, the term "natural convection" or "the natural convection of the first cooling medium F1" may refer to the flow of the first cooling medium F1 occurring due to a specific gravity difference caused by a temperature difference between the high-temperature region (for example, the first tank T1) and the low-temperature region (for example, the third tank T3). That is, in an embodiment of the present disclosure, the flow of the first cooling medium F1 occurring in the cavity C of the first, second, and third tanks T1, T2, and T3 may not rely on the operation of a fluid machine, and unlike the flow of the first cooling medium F1, the flow of the second cooling medium F2 occurring in the cooling tubes CP extending in a direction (the arrangement direction Z2 of the battery cells 10) crossing the flow of the first cooling medium F1 occurring around the cross-sectional surfaces of the battery cells 10 may be driven by a fluid machine such as a fluid pump configured to impart a pressure difference for forced convection. For example, the second cooling medium F2 may be circulated in a closed-loop circulation path, which includes the cooling tubes CP and a separate heat exchanger (not shown) connected to the cooling tubes CP from the outside of the battery pack.

The first cooling medium F1 flowing in the cavity of the first, second, and third tanks T1, T2, and T3 may be fluidically isolated from the outside of the battery pack, and for example, a fluidical connection such as a fluid entrance/exit (for example, an inlet and an outlet) may not be provided for the first cooling medium F1. Unlike the first cooling medium F1, the second cooling medium F2 may be connected to the outside of the battery pack through the cooling tubes CP. For example, the cooling tubes CP extending parallel to each other in the arrangement direction Z2 of the battery cells 10 from an end to another end of the battery pack may have a branching position (not shown) and a joining position (not shown), and the cooling tubes CP provided inside the battery pack may be fluidically connected to an external flow path through an inlet and an outlet that are connected to manifolds (not shown) or header pipes (not shown) connected to the cooling tubes CP at the branching position (not shown) and the joining position (not shown).

In an embodiment of the present disclosure, the first cooling medium F1 may naturally convect in the cavity C of the first, second, and third tanks T1, T2, and T3 between the first tank T1 and the third tank T3 which respectively form the relatively high-temperature region and the relatively low-temperature region around the cross-sectional surfaces (Z1-Z3 plane) of the battery cells 10. In the present specification, the expression "the first cooling medium F1 naturally convects around the cross-sectional surfaces (Z1-Z3 plane) of the battery cells 10" does not limit the flow direction of the first cooling medium F1. For example, the first cooling medium F1 may naturally convect around the cross-sectional surfaces (Z1-Z3 plane) of the battery cells 10 and may also naturally convect across neighboring battery cells 10 in the arrangement direction Z2 of the battery cells 10. In an embodiment of the present disclosure, the natural convection of the first cooling medium F1 occurring in the cavity C of the first, second, and third tanks T1, T2, and T3 is caused by thermal imbalance between different positions. Thus, for example, the natural convection of the first cooling medium F1 may occur across neighboring battery cells 10 in the arrangement direction Z2 of the battery cells 10, and a natural convectional flow of the first cooling medium F1 occurring around the cross-sectional surfaces (Z1-Z3 plane) of the battery cells 10 may mix with or continue together with another natural convectional flow of the first cooling medium F1 occurring in the arrangement direction Z2 of the battery cells 10. For example, a natural convectional flow (driving force of flow) of the first cooling medium F1 occurring around the cross-sectional surfaces (Z1-Z3 plane) of the battery cells 10 may combine with another natural convectional flow (driving force of flow) of the first cooling medium F1 occurring in the arrangement direction Z2 of the battery cells 10 to form a diagonal flow occurring around the cross-sectional surfaces of the battery cells 10 and following the arrangement direction Z2 of the battery cells 10. In an embodiment of the present disclosure, thermal imbalance may occur in the arrangement direction Z2 of the battery cells 10 because accumulation of heat occurs more at a center position at which battery cells 10 are adjacent to each other in the arrangement direction Z2 of the battery cells 10 than at an edge position adjacent to the outside of the battery pack in the arrangement direction Z2 of the battery cells 10. This thermal imbalance acts as a driving force causing a natural convection between a relatively low-temperature region (for example, the edge position) and a relatively high-temperature region (for example, the center position). In an embodiment of the present disclosure, the flow of the first cooling medium F1 inside the second tank T2 facing the lateral surfaces 10S of the battery cells 10 may not occur along a shortest path in the vertical direction Z1 corresponding to the direction of gravity but may occur along an approximately diagonal path sloped with respect to the arrangement direction Z2 of the battery cells 10. That is, the flow of the first cooling medium F1 inside the second tank T2 connecting the first tank T1 and the third tank T3 to each other may occur from the first tank T1 to the third tank T3 along an oblique or diagonal path sloped with respect to the arrangement direction Z2 of the battery cells 10 rather than along a shortest path between the first tank T1 and the third tank T3. Thus, because the first cooling medium F1 flows along a path longer than the shortest path, heat exchange between the first cooling medium F1 and the battery cells 10 may be facilitated, and local heat accumulation may be more effectively prevented in the battery pack. In other words, according to an embodiment of the present disclosure, the first cooling medium F1 flowing in the second tank T2 removes thermal imbalance around the cross-sectional surfaces (Z1-Z3 plane) of the battery cells 10 and thermal imbalance in the arrangement direction Z2 of the battery cells 10, thereby preventing local accumulation of heat in the battery pack.

Figure 8:
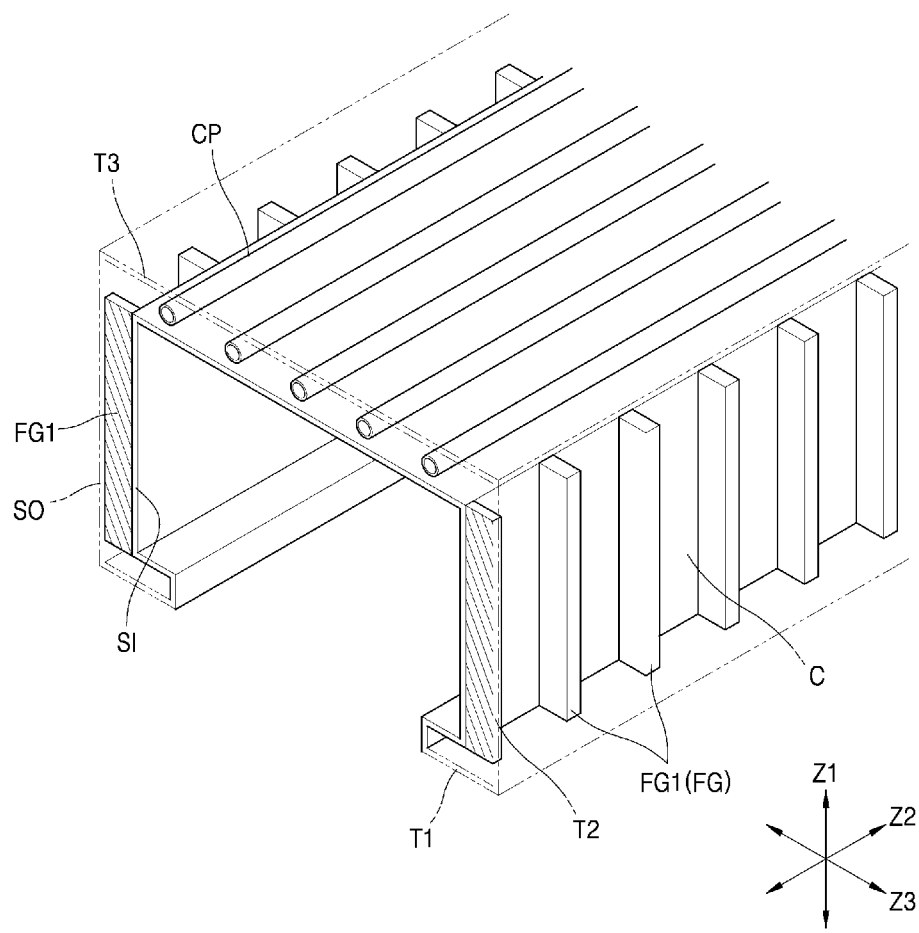
FIGS. 8 to 11 are views illustrating flow guides according to various embodiments of the present disclosure.
Figure 9A:
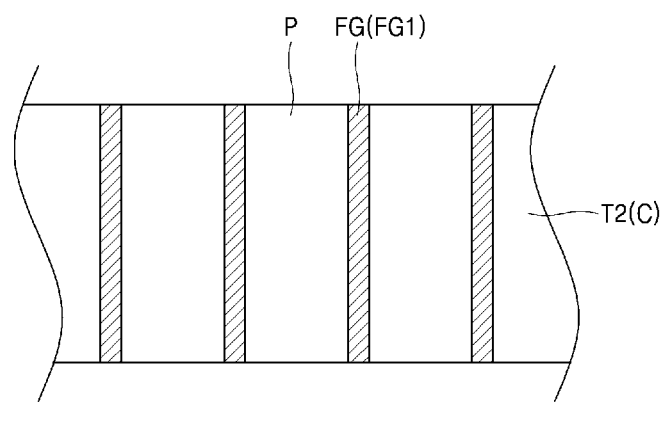
Figure 9A:
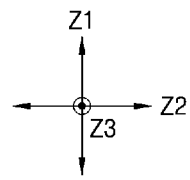
Figure 9B:
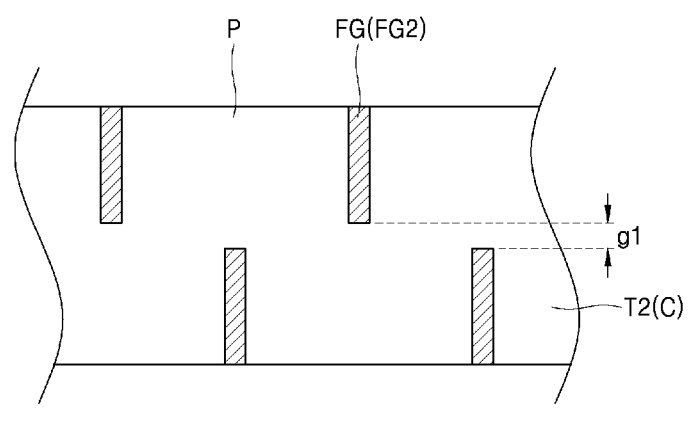
Figure 10A:
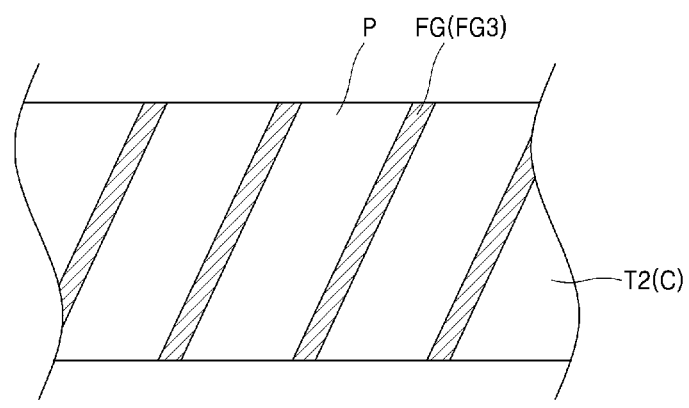
Figure 10B:
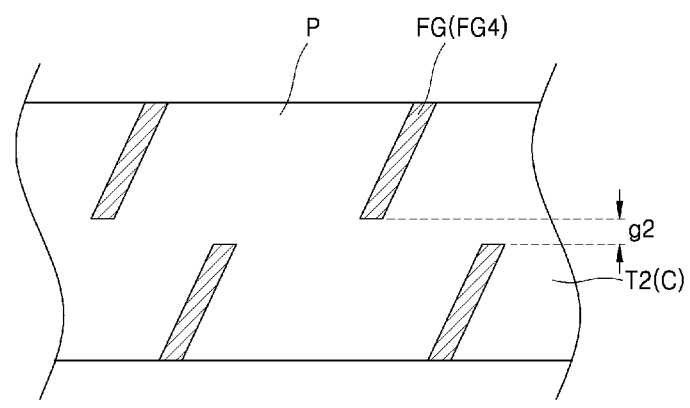
Figure 10B:
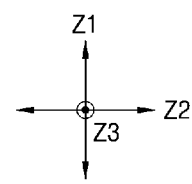

Referring to FIGS. 8 to 11, in an embodiment of the present disclosure, flow guides FG may be formed in the second tank T2 to control the flow of the second cooling medium F2 in the second tank T2. For example, the flow guides FG may be formed in a direction following the vertical direction Z1 from the first tank T1 to the third tank T3. For example, the flow guides FG may include flow guides FG1 and FG2 formed in the vertical direction Z1 from the first tank T1 to the third tank T3, or the flow guides FG may include diagonal flow guides FG3 and F4 formed in a direction following the vertical direction Z1 and the arrangement direction Z2 of the battery cells 10. For example, the flow guides FG may include: ribs FG1 and FG2 formed in the vertical direction Z1 as shown in FIGS. 8 to 9B, or diagonal ribs FG3 and F4 formed in a direction following the vertical direction Z1 and the arrangement direction Z2 of the battery cells 10 as shown in FIGS. 10A and 10B. As described above, the flow guides FG may be formed in the vertical direction Z1 or in an oblique direction following the vertical direction Z1 and the arrangement direction Z2 of the battery cells 10. For example, the flow guides FG may include: ribs FG1 and F3 each continuously formed across the second tank T2 as shown in FIGS. 8, 9A, and 9B; or ribs FG2 and F4 formed in the form of segments which are apart from each other with gaps g1 and g2 therebetween as shown in FIGS. 9B and 10B.

In the various embodiments of the present disclosure shown in FIGS. 8 to 10B, the second tank T2 may include flow paths P and ribs FG1 to FG4 (flow guides FG) that are alternately arranged in the arrangement direction Z2 of the battery cells 10.

Referring to FIG. 7, in an embodiment of the present disclosure, the first, second, and third tanks T1, T2, and T3 may include inner walls SI facing the battery cells 10 and outer walls SO opposite the battery cells 10, and the cavity C may be formed between the inner walls SI and the outer walls SO and may correspond to the width between the inner walls SI and the outer walls SO. For example, each of the first, second, and third tanks T1, T2, and T3 may include: an inner wall SI and an outer wall SO; and the cavity C formed between the inner wall SI and the outer wall SO. The inner wall SI and the outer wall SO may have a uniform width along the battery cells 10, and the cavity C may be formed between the inner wall SI and the outer wall SO. In an embodiment of the present disclosure, the width WC of the cavity C may be greater than the widths WI and WO of the inner walls SI and the outer walls SO. For example, the width WC of the cavity C may be greater than the width WI of the inner walls SI and the width WO of the outer walls SO. In various embodiments of the present disclosure, the width WC of the cavity C may be greater than the sum (WI+WO) of the width WI of the inner walls SI and the width WO of the outer walls SO.

Referring to FIG. 7, the diameter D of the cooling tubes CP accommodated in the third tank T3 may be ⅓ to ½ of the width WC of the cavity C formed between the inner wall SI and the outer wall SO of the third tank T3 (⅓≤D/WC≤½). In other words, when the diameter D of the cooling tubes CP accommodated in the third tank T3 is excluded from the width WC of the cavity C formed between the inner wall SI and the outer wall SO of the third tank T3, the width WA of a flow space in which the first cooling medium F1 may flow inside the third tank T3 may be ½ to ⅔ of the width WC of the cavity (½≤WA/WC≤⅔). For example, in an embodiment of the present disclosure, the width WA of a flow space formed above the cooling tubes CP in the vertical direction Z1, the diameter D of the cooling tubes CP, and the width WA of a flow space formed below the cooling tubes CP may have a ratio of 1:1:1. In this case, the width WA of the flow space, in which the first cooling medium F1 may flow, may be maximized while minimizing the diameter D of the cooling tubes CP. In another embodiment, the width WA of a flow space formed above and below the cooling tubes CP in the vertical direction Z1 and the diameter D of the cooling tubes CP may have a ratio of 1:1. In this case, the width WA of the flow space in which the first cooling medium F1 may flow may be minimized, and the diameter D of the cooling tubes CP may be maximized. In these embodiments, when the diameter D of the cooling tubes CP is smaller than the minimum described above, the heat capacity of the second cooling medium F2 flowing through the cooling tubes CP may be limited and may act as a limiting factor during heat transfer between the first and second cooling media F1 and F2, decreasing the heat dissipation performance of the battery cells 10.

Conversely, when the diameter D of the cooling tubes CP is greater than the maximum described above, the width WC of the flow space, which is calculated by subtracting the diameter D of the cooling tubes CP from the width WC of the cavity C formed between the inner wall SI and the outer wall SO of the third tank T3, is relatively limited. Thus, the heat capacity of the first cooling medium F1 flowing through the flow space may be limited and may thus act as a limiting factor during heat transfer between the first and second cooling media F1 and F2, decreasing the heat dissipation performance of the battery cells 10.

Figure 11:
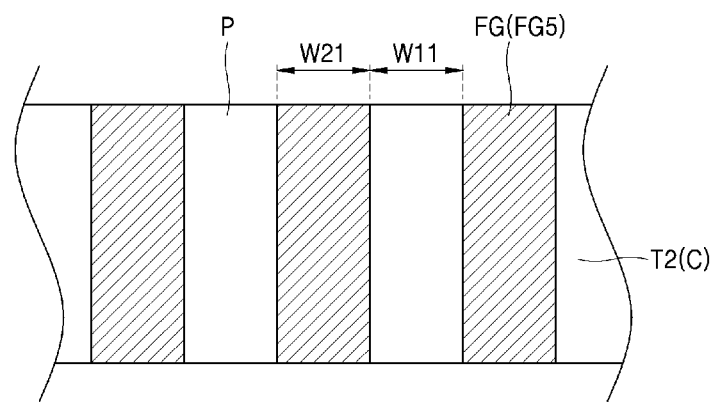
Figure 12:
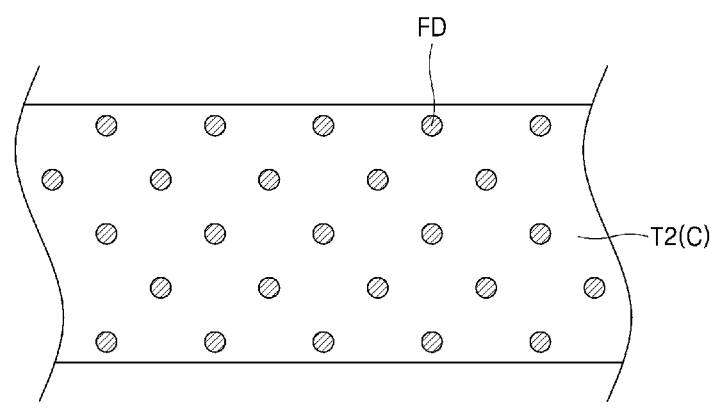
FIG. 12 is a view illustrating flow modification portions according to another embodiment of the present disclosure.

Referring to FIG. 11, in addition to guiding the flow direction of the first cooling medium F1, the flow guides FG may include reinforcement blocks F5 to limit the volume of the first cooling medium F1 and reinforce the rigidity of the second tank T2 in which the flow guides FG are formed. That is, the flow guides FG (reinforcement blocks FG5) may guide the flow direction of the first cooling medium F1 like the ribs FG1 to FG4 shown in FIGS. 8 to 10B, and in addition to this, the flow guides FG (reinforcement blocks FG5) may limit the volume of the first cooling medium F1 and reinforce the rigidity of the second tank T2 in which the flow guides FG are formed.

According to the embodiment shown in FIG. 11, the second tank T2 may include flow paths P and the reinforce blocks FG5 (corresponding to flow guides FG), which are alternately formed. For example, in an embodiment of the present disclosure, the flow paths P and the reinforcement blocks FG5 may be alternately arranged in the arrangement direction Z2 of the battery cells 10. The flow guides FG may control the flow direction of the first cooling medium F1 in the second tank T2, and the flow guides FG or the reinforcement blocks FG5 may have a relatively large width W21 in a direction (the arrangement direction Z2 of the battery cells 10) perpendicular to the extension direction (the vertical direction Z1) of the flow guides FG or the reinforcement blocks FG5. For example, the width W21 of the reinforcement blocks FG5 may be equal to or greater than the width W11 of the flow paths P which are arranged between the reinforcement blocks FG5 and filled with the first cooling medium F1. Thus, for example, the amount of the first cooling medium F1 filled in the second tank T2 may be controlled, and the rigidity of the second tank T2 may be reinforced.

For example, as shown in FIG. 7, the width WC of the cavity C (in the vertical direction Z1) is greater than the width WI of the inner wall SI and the width WO of the outer wall SO of the second tank T2, and thus the rigidity of the second tank T2 may not be sufficient because the inner wall SI and the outer wall SO of the second tank T2 are not sufficiently thick compared with an increase in the amount or weight of the first cooling medium F1 filled in the second tank T2 (specifically, the cavity C of the second tank T2). Thus, the second tank T2 may be physically damaged due to the weight of the first cooling medium F1 filled in the second tank T2 or shocks applied to the second tank T2.

In the embodiment of the present disclosure shown in FIG. 11, the fraction or weight of the first cooling medium F1 in the second tank T2 may be reduced because the width W11 of the flow paths P (in the arrangement direction Z2 of the battery cells 10) in which the first cooling medium F1 is filled may be limited by the reinforcement blocks FG5, and the width W21 of the reinforcement blocks FG5 reinforcing the rigidity of the second tank T2 may increase. Thus, the second tank T2 may not be physically damaged due to insufficient rigidity of the second tank T2.

For reference, in an embodiment of the present disclosure, the flow guides FG formed in the second tank T2 may partition the cavity C shared with the first tank T1 and the third tank T3. For example, in an embodiment of the present disclosure, the cavity C shared by the first, second, and third tanks T1, T2, and T3 is a space in which the first cooling medium F1 may be filled. For example, the cavity C may refer to the flow paths P in which the first cooling medium F1 may be filled except for the flow guides FG. The cavity C may be partitioned by the flow guides FG.

Referring to FIG. 12, in an embodiment of the present disclosure, flow modification portions FD may be formed in the cavity C. The flow modification portions FD may be structures for increasing heat exchange efficiency between the battery cells 10 and the first cooling medium F1 flowing in the cavity C by modifying the flow type of the first cooling medium F1 flowing in the cavity C, for example, by modifying laminar flow, turbulent flow, or eddy flow of the first cooling medium F1 in the cavity C. To this end, the flow modification portions FD may have structures capable of changing the type of flow by modifying, depending on the type of flow, the spatial gradient or distribution of pressure, velocity, or the like related to the energy of flow, such as the distribution of pressure and/or the distribution of flow velocity.

In an embodiment of the present disclosure, the first cooling medium F1 may naturally convect in the cavity C shared by the first, second, and third tanks T1, T2, and T3. Unlike forced convection occurring according to a pressure difference imparted by a fluid machine such as a fluid pump, the natural convection of the first cooling medium F1 may occur at a relatively low flow rate without a pressure difference imparted by a fluid machine and may have a laminar or near-laminar flow form. In an embodiment of the present disclosure, the flow modification portions FD may be formed in the cavity C of the second tank T2 in the form of isolated islands. Inside the cavity C, the flow modification portions FD may change laminar flow of the first cooling medium F1 to a flow form similar to turbulent flow or eddy flow, and thus the efficiency of heat exchange between the first cooling medium F1 and the battery cells 10 may be increased. For example, in the laminar flow of the first cooling medium F1, a boundary layer having a relatively low flow rate (or a flow rate substantially equal to or close to zero) may accumulate on the inner walls SI adjacent to the battery cells 10 due to friction between the first cooling medium F1 and the inner walls SI, and the accumulation of the boundary layer may cause thermal resistance between the inner walls SI and the first cooling medium F1. In addition, layers of the laminar flow of the first cooling medium F1 may hardly mix with each other in a direction perpendicular to the inner walls SI, and thus the laminar or near-laminar flow of the first cooling medium F1 does not guarantee sufficient heat exchange with the battery cells 10.

In an embodiment of the present disclosure, the flow modification portions FD may be formed in the cavity C in which the first cooling medium F1 flows, to change the flow of the first cooling medium F1 from laminar or near-laminar flow to turbulent flow, eddy flow, near-turbulent flow, or near-eddy flow. For example, the flow modification portions FD may include a plurality of flow modification portions FD that are provided inside the cavity C of the second tank T2 as islands isolated from each other and arranged in a uniform pattern. The flow modification portions FD may cause a turbulent flow or eddy flow (or flow similar thereto) in at least a portion of the first cooling medium F1 by applying flow resistance to laminar flow or near-laminar flow of the first cooling medium F1, or applying a pressure distribution resistant to laminar flow or near-laminar flow of the first cooling medium F1. In an embodiment of the present disclosure, laminar or near-laminar flow of the first cooling medium F1 may include a boundary layer having a relatively low flow rate (or a flow rate substantially equal to or close to zero) on the inner walls SI adjacent to the battery cells 10 due to friction between the first cooling medium F1 and the inner walls SI, and layers of the laminar or near-laminar flow of the first cooling medium F1 may hardly mix with each other in a direction perpendicular to the inner walls SI. Thus, the flow modification portions FD may change the laminar or near-laminar flow of the first cooling medium F1 to turbulent flow, eddy flow, or flow similar thereto at positions close to the flow modification portions FD to cause the first cooling medium F1 to collide with the inner walls SI adjacent to the battery cells 10 or cause layers of the laminar or near-laminar flow of the first cooling medium F1 to mix with each other in a direction perpendicular to the inner walls SI, thereby facilitating heat transfer from the inner walls SI adjacent to the battery cells 10.

In the accompanying drawings of the present specification, the flow guides FG and/or the flow modification portions FD are formed in the cavity C of the second tank T2. In various embodiments of the present disclosure, however, the flow guides FG and/or the flow modification portions FD may be formed at any positions in the cavity C of the first, second, and third tanks T1, T2, and T3. For example, the flow guides FG and/or the flow modification portions FD may be formed in the cavity C of at least one, two or more, or all of the first, second, and third tanks T1, T2, and T3.

In an embodiment of the present disclosure, the first cooling medium F1 accommodated in the cavity C shared by the first, second, and third tanks T1, T2, and T3 may have heat capacity different from the heat capacity of the second cooling medium F2 contained in the cooling tubes CP extending across the cavity C of the third tank T3. For example, the heat capacity of the first cooling medium F1 may be greater than the heat capacity of the second cooling medium F2. For example, the first cooling medium F1 may naturally convect in the cavity C, and the second cooling medium F2 may forcedly convect in the cooling tubes CP. The second cooling medium F2 flowing in the cooling tubes CP at a relatively high flow rate may facilitate heat transfer more than the first cooling medium F1 flowing in the cavity C at a relatively low flow rate. For example, the flow rate of forced convection (the flow rate of the second cooling medium F2) in the cooling tubes CP, which is relatively ease to control, may be adjusted to precisely control heat transfer occurring by the second cooling medium F2 having a relatively low heat capacity. For example, manufacturing costs may be reduced by using the second cooling medium F2 having a relatively low heat capacity, and the flow rate of controllable forced convection of the second cooling medium F2 may be increased or decreased for balance between heat transfer by the second cooling medium F2 and heat transfer by the first cooling medium F1 flowing in the cavity C.

While embodiments of the present disclosure have been described with reference to the accompanying drawings, the embodiments are for illustrative purposes only, and it will be understood by those of ordinary skill in the art that various modifications and equivalent other embodiments may be made therefrom. Therefore, the scope and spirit of the present disclosure should be defined by the following claims.

The present disclosure may be applied to battery packs which are rechargeable energy sources, and to various devices using battery packs as power sources.

What is claimed is:

1. A battery pack comprising:
    battery cells each comprising a terminal surface on which an electrode terminal is formed, a top surface which is opposite the terminal surface, and a lateral surface which is between the terminal surface and the top surface;
    a first tank facing the terminal surfaces of the battery cells;
    a second tank extending from the first tank and facing the lateral surfaces of the battery cells; and
    a third tank extending from the second tank and facing the top surfaces of the battery cells,
    wherein a cavity is formed in the first to third tanks to extend across the first to third tanks, and the cavity is filled with a first cooling medium and is fluidically isolated from outside of the battery pack,
    wherein a cooling tube is accommodated in the third tank to extend across the cavity, and the cooling tube accommodates flow of a second cooling medium different from the first cooling medium.

2. The battery pack of claim 1, wherein the cavity extends continuously from the first tank to the third tank across the second tank.

3. The battery pack of claim 2, wherein the cavity in the first tank faces the terminal surfaces of the battery cells,
    the cavity in the second tank faces the lateral surfaces of the battery cells, and
    the cavity in the third tank faces the top surfaces of the battery cells.

4. The battery pack of claim 1, wherein the battery cells are disposed such that the terminal surfaces of the battery cells are on a lower side and the top surfaces of the battery cells are on an upper side in a vertical direction corresponding to a direction of gravity.

5. The battery pack of claim 1, wherein the first tank is a high-temperature region, and the third tank is a low-temperature region,
wherein the first cooling medium expands as being heated in the cavity of the first tank disposed on the lower side and receives upward pressure, and the first cooling medium contracts as being cooled in the cavity of the third tank disposed on the upper side and receives downward pressure, such that the first cooling medium naturally convects between the first tank and the third tank.

6. The battery pack of claim 1, wherein the first to third tanks continuously surround the terminal surfaces, the lateral surfaces, and the top surfaces of the battery cells around cross-sectional surfaces of the battery cells, and
the cooling tube extends in an arrangement direction of the battery cells, the arrangement direction crossing the cross-sectional surfaces of the battery cells.

7. The battery pack of claim 6, wherein the cooling tube extends across the battery cells in the arrangement direction of the battery cells to cross the first to third tanks extending around the cross-sectional surfaces of the battery cells.

8. The battery pack of claim 1, wherein the first to third tanks each comprise an inner wall which faces the battery cells and an outer wall which is opposite the battery cells, and
a width of the cavity between the inner wall and the outer wall is greater than a total width of the inner wall and the outer wall.

9. The battery pack of claim 1, wherein flow guides are formed in the cavity to guide a flow direction of the first cooling medium.

10. The battery pack of claim 9, wherein the flow guides are formed in the cavity of the second tank.

11. The battery pack of claim 9, wherein the flow guides extend in a vertical direction in which the terminal surfaces of the battery cells face the top surfaces of the battery cells.

12. The battery pack of claim 9, wherein the flow guides obliquely extend to follow an arrangement direction of the battery cells and a vertical direction in which the terminal surfaces of the battery cells face the top surfaces of the battery cells.

13. The battery pack of claim 9, wherein the flow guides comprise ribs configured to guide the flow direction of the first cooling medium.

14. The battery pack of claim 13, wherein the battery cells comprise a plurality of battery cells, and
flow paths filled with the first cooling medium and the ribs are alternately arranged in the second tank in an arrangement direction of the plurality of battery cells.

15. The battery pack of claim 9, wherein the flow guides comprise reinforcement blocks configured to guide the flow direction of the first cooling medium, limit volume of the first cooling medium, and reinforce rigidity of the second tank in which the flow guides are formed.

16. The battery pack of claim 15, wherein the battery cells comprise a plurality of battery cells, and
flow paths filled with the first cooling medium and the reinforcement blocks are alternately arranged in the second tank in an arrangement direction of the plurality of battery cells.

17. The battery pack of claim 15, wherein, in a direction perpendicular to an extension direction of the reinforcement blocks, a width of the reinforcement blocks is equal to or greater than a width of flow paths filled with the first cooling medium.

18. The battery pack of claim 1, wherein flow modification portions are formed in the cavity to change a flow type of the first cooling medium flowing in the cavity.

19. The battery pack of claim 18, wherein the flow modification portions comprise a plurality of flow modification portions isolated from each other and formed in a uniform pattern.

20. The battery pack of claim 1, wherein the first cooling medium accommodated in the cavity and the second cooling medium accommodated in the cooling tube have different heat capacities.

21. The battery pack of claim 20, wherein the heat capacity of the first cooling medium is greater than the heat capacity of the second cooling medium.

22. The battery pack of claim 1, wherein the first cooling medium naturally convects in the cavity, and
the second cooling medium forcedly convects in the cooling tube.

23. The battery pack of claim 22, wherein a flow rate of the second cooling medium is greater than a flow rate of the first cooling medium.

* * * * *